6 Sheets—Sheet 1.

J. T. WALKER.

Assignor to T. S. WILES & A. P. ADAMS.

IRONING-MACHINE.

No. 7,346. Reissued Oct. 10, 1876.

*Attest:*

*William A. Rousseau*

*James T. Goodfellow.*

*Inventor:*

*James T. Walker,*

*By Austin F. Park,*

*Attorney.*

THE NORRIS PETERS CO., PHOTO-LITHO., WASHINGTON, D. C.

J. T. WALKER.

Assignor to T. S. WILES & A. P. ADAMS.

IRONING-MACHINE.

No. 7,346. Reissued Oct. 10, 1876.

Attest:

William A. Rousseau

James T. Goodfellow.

Inventor:

James T. Walker,

By Austin F. Park,

Attorney.

THE NORRIS PETERS CO., PHOTO-LITHO., WASHINGTON, D. C.

J. T. WALKER.

Assignor to T. S. WILES & A. P. ADAMS.

IRONING-MACHINE.

No. 7,346. Reissued Oct. 10, 1876.

Attest:

William A. Rousseau

James T. Goodfellow.

Inventor:

James T. Walker,

By Austin F. Park, attorney.

THE NORRIS PETERS CO., PHOTO-LITHO., WASHINGTON, D. C.

J. T. WALKER.

Assignor to T. S. WILES & A. P. ADAMS.

IRONING-MACHINE.

No. 7,346. Reissued Oct. 10, 1876.

*Attest:*

*William A. Rousseau*

*James T. Goodfellow*

*Inventor:*

*James T. Walker,*

*By Austin F. Park,*

*Attorney.*

THE NORRIS PETERS CO., PHOTO-LITHO., WASHINGTON, D. C.

J. T. WALKER.

Assignor to T. S. WILES & A. P. ADAMS.

IRONING-MACHINE.

No. 7,346. Reissued Oct. 10, 1876.

Attest:

William A. Rousseau

James T. Goodfellow

Inventor:

James T. Walker,

By Austin F. Park

Attorney.

THE NORRIS PETERS CO., PHOTO-LITHO., WASHINGTON, D. C.

J. T. WALKER.

Assignor to T. S. WILES & A. P. ADAMS.

IRONING-MACHINE.

No. 7,346. Reissued Oct. 10, 1876.

*Attest:*

William A. Rousseau

James T. Goodfellow

*Inventor.*

James T. Walker,

By Austin F. Park,

Attorney.

THE NORRIS PETERS CO., PHOTO-LITHO., WASHINGTON, D. C.

UNITED STATES PATENT OFFICE.

JAMES T. WALKER, OF ALBANY, NEW YORK, ASSIGNOR TO THOMAS S. WILES AND ALONZO P. ADAMS, OF SAME PLACE.

IMPROVEMENT IN IRONING APPARATUS.

Specification forming part of Letters Patent No. 145,034, dated November 25, 1873; reissue No. 7,346, dated October 10, 1876; application filed August 14, 1876.

*To all whom it may concern:*

Be it known that I, JAMES T. WALKER, of Albany, in the county of Albany and State of New York, have invented certain new and useful Improvements in Ironing-Machines, of which the following is a specification, reference being had to the accompanying drawings, in which—

Figure 1:
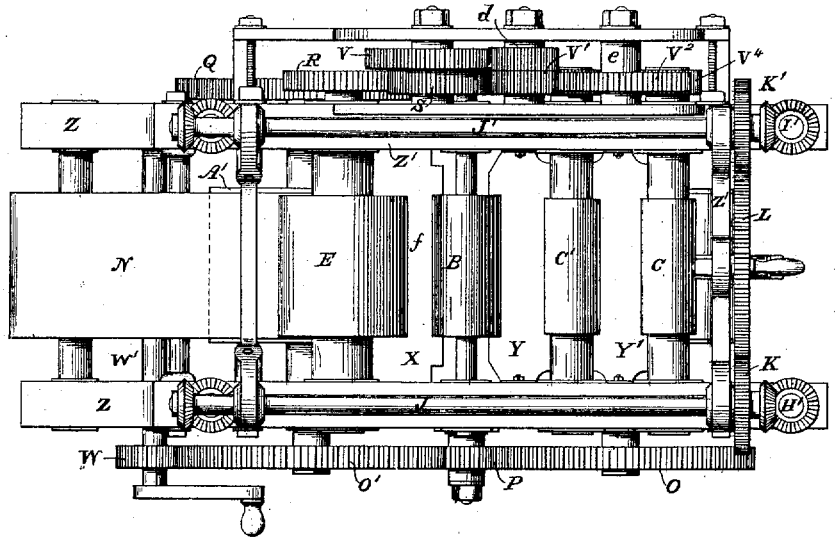
Figure 2:
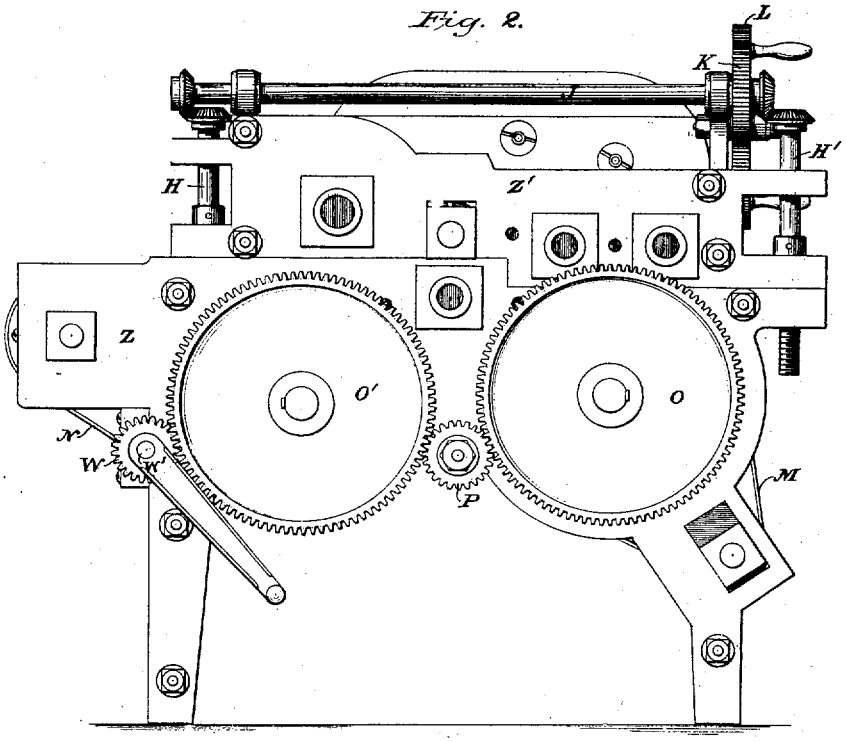
Figure 3:
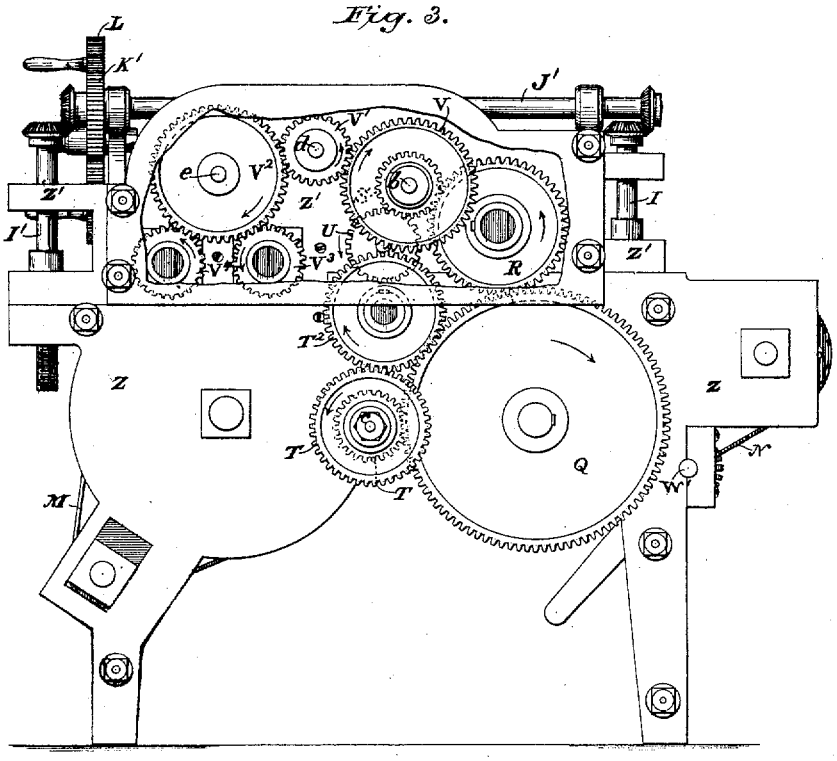
Figure 4:
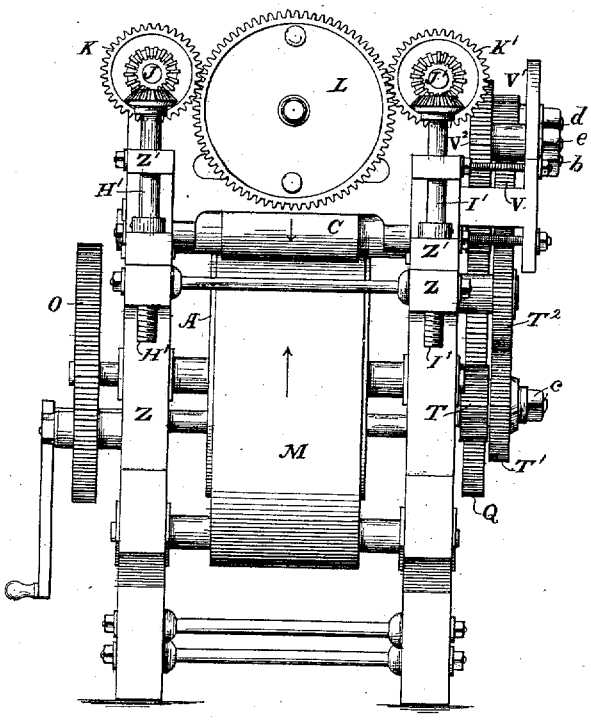
Figure 5:
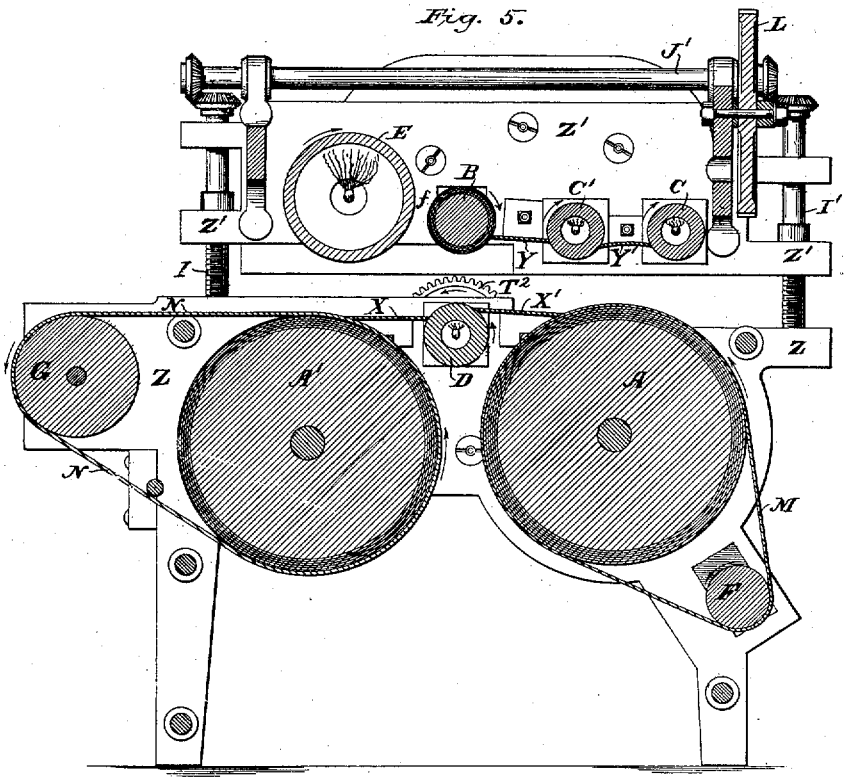
Figure 6:
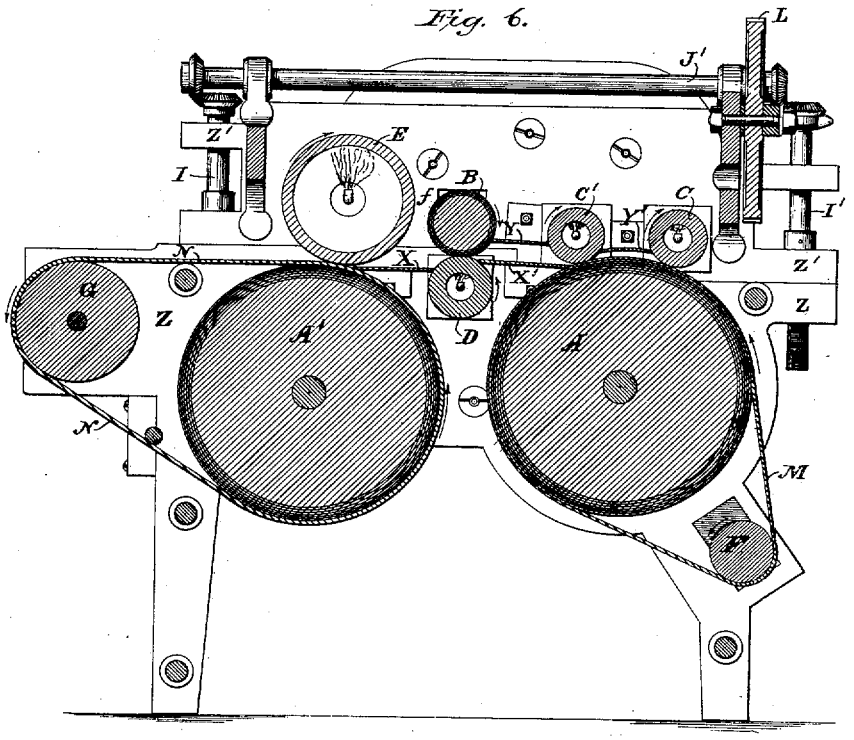

Figure 1 is a plan, Fig. 2 an elevation of one side, Fig. 3 an elevation of the other side, and Fig. 4 an end elevation, all of an ironing-machine which embodies my invention. Fig. 5 is a central vertical longitudinal section of the same machine, showing the rollers separated; and Fig. 6 is a like section, representing the rollers adjusted together as they are in Figs. 2, 3, and 4.

A, B, and A′ are rollers, each covered with an elastic substance, such as felt, woolen cloth, or other suitable material, preferably with smooth cotton cloth on the outside. C, C′, D, and E are hollow metallic ironing-rollers, each having a smooth outer surface, and its journals hollow, for the insertion of gas-pipe with burners to heat the rollers by gas. F and G are plain idle-pulleys. Around the roller A and pulley F is an endless belt or apron, M, of muslin or other suitable material. Around the roller A′ and pulley G there is also an endless belt, N, of muslin or other suitable material. X is a guide between the rollers D and A′, and X′ is a guide between the rollers A and D. Y is a guide between the rollers C′ and B, and Y′ is a guide between the rollers C and C′.

The frame of the machine is divided so as to form an upper frame, Z′, and a lower frame, Z. The lower frame Z contains the rollers A, D, and A′, pulleys F and G, and guides X and X′. The upper frame Z′ contains the rollers C, C′, B, and E, and guides Y and Y′. The frames are connected by means of vertical screws H, H′, I, and I′, and to the upper ends of these screws are fastened bevel-gears, which gear with similar bevel-gears upon two shafts, J and J′. These shafts have also fastened to them two spur-wheels, K and K′, which are geared together by means of the intermediate spur-wheel L. Attached to the spur-wheel L are suitable handles for turning the same. By turning the spur-wheel L the screws H, H′, I, and I′ will be caused to revolve, and by their action the upper frame Z′ will be raised and lowered.

The rollers A and A′ are geared together by means of the spur-wheels O and O′, Fig. 2, on one end of the shafts of those rollers, and an intermediate spur-wheel, P. On the other end of the shaft of the roller A′ is a spur-wheel, Q, Figs. 1 and 3, which gears into a spur-wheel, R, fast on the shaft of the roller E. The spur-wheel R also gears into a spur-wheel, S, on the stud *b*, and the spur-wheel S gears into a spur-wheel, U, fast on the shaft of the roller B. The spur-wheel Q also gears into a spur-pinion, T, Figs. 3 and 4, which is mounted on a stud, *c*, and is secured to a spur-wheel, $T^1$, that gears into a spur-wheel, $T^2$, fast on the shaft of the roller D. To the spur-wheel S is secured a spur-wheel, V, which gears into a spur-wheel, $V^1$, that is mounted on a stud, *d*, and engages with a spur-wheel, $V^2$, which is mounted on a stud, *e*, and gears into a spur-wheel, $V^3$, fast on the shaft of the roller C′, and also gears into a spur-wheel, $V^4$, fast on the shaft of the roller C. The machine is driven by a pinion, W, fast on a main driving-shaft, W′, and gearing into the spur-wheel O′.

The gearing and rollers thus described are represented in the aforesaid drawings as being so arranged and proportioned that the circumferences of the elastic-covered rollers A, A′, and B, and of the ironing-rollers D and E, are all turned at substantially the same speed, and that the circumferences of the ironing-rollers C and C′ are turned at about twice the speed of the circumference of the elastic roller A.

By means of set-screws the elastic-covered rollers A, B, and A′ can be made to press against the ironing-rollers with the proper degree of pressure.

The manner of working the machine is as follows: The upper frame Z′ being raised, as shown in Fig. 5, the ironing-rollers C, C′, D, and E are heated by means above mentioned. The upper frame is then lowered so that the rollers C and C′ shall be in contact with the roller A, the roller B in contact with the roller D, and the roller E in contact with the roller A′, as represented in Fig. 6. The machine then being put in motion, the rollers will revolve in the direction shown by the arrows, and a collar or cuff, being entered between the rollers A and C, will be carried by the elastic-covered roller A under the heated ironing-rollers C and C′, whose surfaces, moving faster than the surface of the roller A, will smooth and polish the upper surface of the collar or cuff, which will be next passed between the elastic-covered roller B and the ironing-roller D, which will polish or smooth the under side of the collar or cuff, which will thence be passed between the rollers E and A′, by which the drying and ironing of the collar or cuff will be finished.

It will be observed that the endless aprons M and N are not essential to the operation of the machine, as above described, and that the rollers will work, as above specified, without those aprons. When the aprons are used, they make smooth surfaces on the rollers A A′, and can be easily renewed when worn out; and the apron N also carries the collars, cuffs, or other articles, in a straight line as they come out from under the roller E.

In the above-described operation of the machine the elastic covering of each of the rollers A, B, and A′ (whether the aprons M and N shall or shall not constitute the outer part of the coverings of the rollers A and A′) absorbs and discharges moisture forced out of the damp articles being ironed, and does not slip on those articles so easily as the heated ironing-rollers, and consequently controls the movements of the articles in their passage between the rollers, and, by its elasticity, yields to hems, seams, and other thick parts of collars, cuffs, or other articles passing between the rollers, and thereby materially prevents injurious compression and strain thereof, and equalizes the pressing and ironing action of the rollers upon the thin and thick parts of the articles, and causes the side of the articles next to the ironing-roller to be left with a smooth even surface, while the side of the articles next to the elastic-clothed roller is left with the thick parts raised above the thin parts.

It will be observed that the two reversely-arranged sets of ironing and elastic-clothed rollers D B and A′ E are shown combined and geared together, as hereinbefore specified, independently of the rollers A C C′, and so that, in the absence of the latter rollers, suitable articles of cloth having some parts thicker than others can be passed between the two ironing and clothed rollers D B, and thereby ironed evenly on one side, and thence passed between the two clothed and ironing rollers A′ E, and thereby ironed evenly on the other side, all at one direct progressive operation, without turning over or reversing the articles in their passage from one set of the rollers to the other set.

In ironing thick damp collars or cuffs of cloth, by passing them between the sets of heated ironing-rollers and elastic-clothed rollers pressed together, such articles are liable to be bent or curved toward each ironing roller, by the conforming action of the elastic-clothed rollers with and against the heated ironing-rollers; and one principal office of the guides X, Y, and Y′ is to progressively straighten or bend back such bent or curved articles as they issue from the sets of ironing and clothed rollers.

By means of the combination of the two reversely-arranged sets of ironing and clothed rollers D B and E A′, and the guide X, arranged between the rollers D and A′, as hereinbefore specified, and represented in the drawings, collars, cuffs, or suitable articles of cloth having parts of different thickness, and introduced between the set of rollers B D, will be passed through between and ironed evenly on one side only by that set of rollers, and will be thence directed, by the guide X, into and passed through between the set of rollers E A′, and thereby ironed evenly on the other side, all at one direct progressive automatic operation.

By means of the combination of the two reversely-arranged sets of clothed and ironing rollers A C′ and B D, and one or both of the intermediate guides X′ Y, with or without the ironing-roller C and guide Y, collars, cuffs, or other suitable articles of cloth having parts of different thickness, will, when properly introduced between the first set of rollers, A C′ or A C C′, be passed through between and ironed evenly, on one side only, by that set of rollers, and thence directed by one or both of the guides X′ Y into and passed through between the set of rollers B D, and thereby ironed evenly on the other side, all at one direct progressive operation.

By means of the combination of the three reversely-arranged sets of ironing and clothed rollers A′ E, D B, and A C′, and the intervening guides X and X′ Y, with or without the roller C and guide Y′, collars, cuffs, or other suitable articles of cloth having some parts thicker than others, and a face side, which requires more ironing and a better finish than the other side, will, when properly introduced between the first set of rollers A C′ or A C C′, be passed through between and ironed on the face side only by that set of rollers, and thence conducted into and passed through between the second set of rollers B D, and thereby ironed on the other side, and thence directed into and passed through between the last set of rollers E A′, and thereby reironed and finished smooth and even on the face side, and with the thicker parts left raised above the thinner parts on the other side of the articles, all at one progressive operation.

It will be seen that the ironing-roller E is over the elastic roller A′ in the last set of rollers, so that the articles will be delivered from the machine with the last ironed side uppermost, for convenient inspection. It will also be noticed that there is between the upper roller E of the last set and the upper roller B of the next preceding set an open space, *f*, Figs. 1 and 6. With this construction, a person at or near the delivery end of the machine can readily discover any article that shall be imperfectly ironed by the rollers, and can take up such article and introduce it by hand through the open space *f* to the last set of rollers E A′ only, and thus cause the article to be reironed on the proper side by that set of rollers, without the liability of scorching the article that would occur if it should be passed a second time through between the preceding set or sets of rollers.

By the combination of the two ironing-rollers C and C′ with the one clothed roller A, suitable damp articles of cloth having parts of different thickness, and entered between the rollers A and C, will be passed through between those two rollers, and thereby partially ironed on one side, and thence immediately carried by the roller A to and between the ironing-roller C′ and clothed roller A, and thereby reironed on the same side, all at one progressive operation, while each of the two ironing-rollers C and C′ can be separately heated, as hereinbefore stated, to the proper different degrees suited to act most effectively upon the articles in their different conditions as they are thus submitted in the rough and dampest state to the ironing-roller C, and afterward in a dryer and partly-ironed condition to the ironing-roller C′.

By having two or more of the ironing-rollers and two or more of the clothed rollers combined, so as to iron articles first on one side only, and next only on the other side, and mounted in the stationary and movable frames Z and Z′, as hereinbefore described, the clothed and ironing rollers of each of the reversely-arranged sets can all be readily separated at once, so as to thereby prevent the burning or scorching of the clothed rollers whenever the ironing-rollers shall be heated while the rollers are not revolving.

What I claim as my invention is—

1. The combination of an ironing-roller and a clothed roller with another clothed roller and ironing-roller, all arranged and geared together so as to iron articles first on one side only, and next on the other side, all at one progressive operation, substantially as described.

2. The clothed roller B and ironing-roller D, in combination with the ironing-roller E and clothed roller A′, and the intermediate guide, all arranged to operate substantially as described.

3. The ironing-roller C′ and clothed roller A, in combination with the clothed roller B and ironing-roller D, and the intervening guide or guides, substantially as described.

4. The combination of the clothed rollers A, B, and A′ with the ironing-rollers C′, D, and E, and intervening guides, substantially as set forth.

5. The combination of a clothed roller, A, and two ironing-rollers, C C′, constructed so as to be heated internally, and both arranged and geared to turn in surface-contact with the said clothed roller, and furnished with an intervening clearing-guide, substantially as described.

6. Two or more ironing-rollers and two or more clothed rollers, combined so as to iron articles first on one side, and next on the other side, and mounted in stationary and movable frames, by which the clothed and ironing rollers can all be separated at once, substantially as described.

In testimony whereof I hereunto set my hand this 27th day of October, 1875.

JAMES T. WALKER.

Witnesses:

AUSTIN F. PARK,

JAMES T. GOODFELLOW.